United States Patent
Chande et al.

(10) Patent No.: US 11,622,380 B2
(45) Date of Patent: Apr. 4, 2023

(54) SEMI-PERSISTENT RESERVATIONS OF MEDIUM FOR INTERFERENCE MANAGEMENT AND MEDIUM ACCESS

(71) Applicant: QUALCOMM INCORPORATED, San Diego, CA (US)

(72) Inventors: Vinay Chande, San Diego, CA (US); Arumugam Chendamarai Kannan, San Diego, CA (US); Xiaoxia Zhang, San Diego, CA (US); Srinivas Yerramalli, Hyderabad (IN); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 17/248,451

(22) Filed: Jan. 25, 2021

(65) Prior Publication Data

US 2021/0250992 A1 Aug. 12, 2021

Related U.S. Application Data

(60) Provisional application No. 62/971,770, filed on Feb. 7, 2020.

(51) Int. Cl.
*H04W 74/04* (2009.01)
*H04W 72/04* (2023.01)

(52) U.S. Cl.
CPC ........... *H04W 74/04* (2013.01); *H04W 72/04* (2013.01)

(58) Field of Classification Search
CPC .............................. H04W 74/04; H04W 72/04
See application file for complete search history.

(56) References Cited

U.S. PATENT DOCUMENTS

2008/0107047 A1* 5/2008 Olfat ............... H04W 16/02
370/208
2010/0329374 A1* 12/2010 Pi .................... H04L 5/0007
375/295

(Continued)

FOREIGN PATENT DOCUMENTS

WO 2020168072 A1 8/2020

OTHER PUBLICATIONS

Huawei, et al., "UL PHY Channels for NR Unlicensed", 3GPP TSG RAN WG1 Meeting #95, 3GPP Draft R1-1812193, 3rd Generation Partnership Project (3GPP), Mobile Competence Centre, 650, Route Des Lucioles F-06921 Sophia-Antipolis Cedex, France, vol. RAN WG1, No. Spokane, US; Nov. 12, 2018-Nov. 16, 2018, 22 Pages, Nov. 11, 2018 (Nov. 11, 2018), XP051554065, Retrieved from the Internet: URL: http://www.3gpp.org/ftp/Meetings%5F3GPP%5FSYNC/RAN1/Docs/R1%2D1812193%2Ezip [retrieved on Nov. 11, 2018] p. 3, line 16-line 24; figure 1.

(Continued)

*Primary Examiner* — Raj Jain
(74) *Attorney, Agent, or Firm* — Haynes and Boone, LLP

(57) ABSTRACT

Methods related to wireless communications systems and medium access in a radio frequency band of a shared spectrum are provided. A device contends for a first reserved time interlace including a plurality of channel occupancy times (COTs). The device transmits a first communication signal in a first COT of the plurality of COTs in response to winning the first reserved time interlace. The device transmits a second communication signal in a second COT of the plurality of COTs, the second COT spaced in time from the first COT, in response to winning the first reserved time interlace.

28 Claims, 8 Drawing Sheets

(56) References Cited

U.S. PATENT DOCUMENTS

| | | |
|---|---|---|
| 2017/0257879 A1* | 9/2017 | Kang ................ H04W 74/0816 |
| 2018/0255577 A1* | 9/2018 | Lee .................. H04W 74/0808 |
| 2019/0208436 A1 | 7/2019 | Zhou et al. |
| 2020/0059963 A1 | 2/2020 | Damnjanovic et al. |
| 2020/0229205 A1 | 7/2020 | Bharadwaj et al. |
| 2020/0236708 A1 | 7/2020 | Li et al. |
| 2021/0250992 A1* | 8/2021 | Chande ................ H04W 74/04 |

OTHER PUBLICATIONS

Nokia, et al., "On Uplink Signal and Channel Structures for NR-U", 3GPP Draft, 3GPP TSG RAN WG1 Ad-Hoc Meeting 1901, R1-1900260, UL Signal and Channels, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593174, 12 Pages, [Cont'd in Box 3].
[Cont'd from Box2] Retrieved from the Internet: URL: http://www.3gpp.org/ftp/Meetings%5F3GPP%5FSYNC/RAN1/Docs/R1%2D1900260%2Ezip [retrieved on Jan. 20, 2019] SRS; p. 9, paragraph 5, paragraph [03.2], paragraph [0006].
Partial International Search Report—PCT/US2021/014974—ISA/EPO—dated May 25, 2021.
International Search Report and Written Opinion—PCT/US2021/014974—ISA/EPO—dated Jul. 20, 2021.

* cited by examiner

US 11,622,380 B2

SEMI-PERSISTENT RESERVATIONS OF MEDIUM FOR INTERFERENCE MANAGEMENT AND MEDIUM ACCESS

CROSS REFERENCE TO RELATED APPLICATIONS

The present application claims priority to and the benefit of U.S. Provisional Patent Application No. 62/971,770, filed Feb. 7, 2020, which is hereby incorporated by reference in its entirety as if fully set forth below and for all applicable purposes.

TECHNICAL FIELD

This disclosure relates to wireless communication systems, and more particularly to medium access arrangements in a wireless spectrum, including semi-persistent reservations for interference management and medium access control.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmW) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a contention resolution like a listen-before-talk (LBT) scheme to ensure that a shared channel is clear before transmitting a signal. For example, a transmitting node may listen to the channel to determine whether there are active transmissions in the channel. When the channel is idle, the transmitting node may transmit a reservation signal (e.g., a preamble) to reserve a channel occupancy time (COT) in the shared channel and may communicate with a receiving node during the COT. However, performing contention resolution to reserve COTs can be an inefficient use of resources as a result of the overhead and delays associated with contention resolution.

The overhead associated with contention resolution can be significant in industrial Internet of Things (IIOT) applications. For instance, in an IIOT scenario, an IOT device (e.g., machines, industrial equipment, smart meters, smart sensors, and/or the like) may upload measurement readings or reports to a network server at some preconfigured time. The network may also send controls to the IIOT device and/or monitor certain operations (e.g., energy usages) of the IIOT device at certain time periods. Thus, the transmission payload data size in IIOT may be relative small (e.g., tens of bytes) and the traffic pattern may be relatively predictable (e.g., quasi-periodic). As such, the penalty or overhead for contention resolution is high for IIOT traffic. Further, IIOT application may have strict timing requirements and may not tolerate delay. Thus, besides the contention overhead, having to contend the medium for each IIOT traffic transfer can cause unpredictable delay due to the contention. Aspects of the present disclosure can provide a more efficient use of network resources with reduced latency by providing access to a shared spectrum through the use of a semi-persistent reservation scheme.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication comprises contending, by a first wireless communication device, for a first reserved time interlace, the first reserved time interlace including a plurality of channel occupancy times (COTs); transmitting, by the first wireless communication device in response to winning the first reserved time interlace, a first communication signal in a first COT of the plurality of COTs; and transmitting, by the first wireless communication device in response to winning the first reserved time interlace, a second communication signal in a second COT of the plurality of COTs, the second COT spaced in time from the first COT. Aspects of the disclosure allow devices to avoid the overhead of lengthy contention resolution schemes before transmitting signals, allowing the devices to communicate more efficiently with interference management among themselves. Devices may be less likely to delay or refrain from transmitting a signal in response to a false positive result from energy or reservation signal detection by using aspects of the present disclosure. Additionally, the contention resolution overhead may be decoupled from the COT duration and traffic demand, making it possible to have low collision probabilities without incurring an overhead penalty. Licensed spectrum deployments, especially those with low delay and low latency requirements, may also benefit from interreference management based on reservation-based silencing of interferers.

In an additional aspect of the disclosure, a method of wireless communication comprises contending, by a first wireless communication device, for a first reserved time interlace, the first reserved time interlace including a plurality of channel occupancy times (COTs); monitoring, by the first wireless communication device in response to losing the first reserved time interlace, for a COT occupancy signal associated with each of the plurality of COTs; and transmitting, by the first wireless communication device based on the monitoring not detecting a first COT occupancy signal associated with a first COT of the plurality of COTs, a first communication signal in the first COT.

In an additional aspect of the disclosure, an apparatus comprises a processor configured to contend for a first reserved time interlace, the first reserved time interlace including a plurality of channel occupancy times (COTs); and a transceiver in communication with the processor, the transceiver configured to transmit, in response to winning the first reserved time interlace, a first communication signal in a first COT of the plurality of COTs, and transmit, in response to winning the first reserved time interlace, a second communication signal in a second COT of the plurality of COTs, the second COT spaced in time from the first COT.

In an additional aspect of the disclosure, an apparatus comprises a processor configured to contend for a first reserved time interlace, the first reserved time interlace including a plurality of channel occupancy times (COTs); and a transceiver in communication with the processor, the transceiver configured to monitor, in response to losing the first reserved time interlace, for a COT occupancy signal associated with each of the plurality of COTs, and transmit, based on the monitoring not detecting a first COT occupancy signal associated with a first COT of the plurality of COTs, a first communication signal in the first COT.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
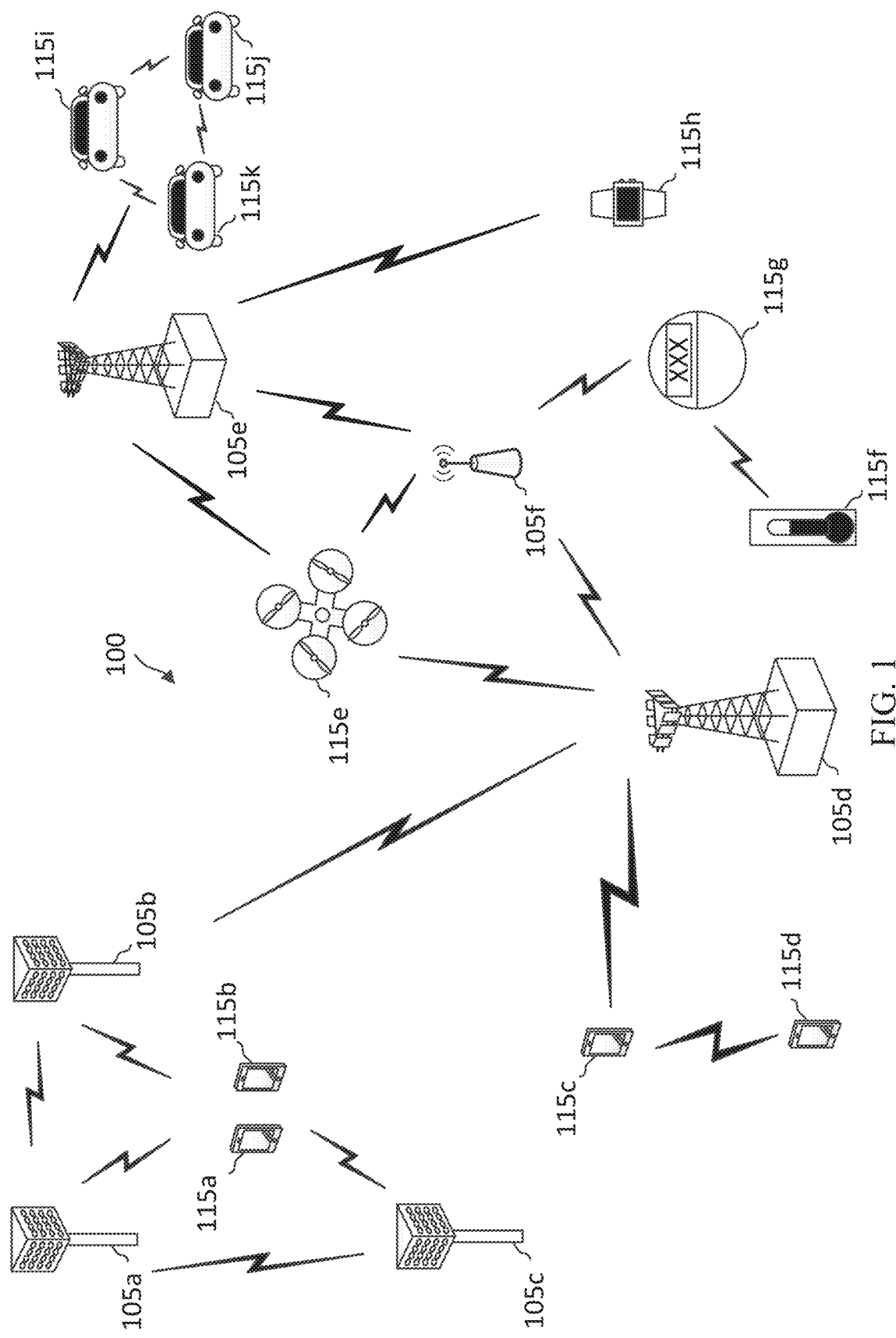
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

To enable coexistence among multiple devices in a shared or unlicensed spectrum, a contention resolution scheme such as clear channel assessment (CCA), extended clear channel assessment (ECCA), a contention window 1 (CW1), a contention window 2 (CW2), a category 2 LBT, a category 3 LBT, a category 4 LBT, or any other contention scheme, including receiver-assisted schemes (e.g., receiver reservations by energy injection), may be used to assess whether a channel is clear before transmitting a signal in the channel. All these contention schemes require a contending node to perform energy detection and/or signal detection to determine the availability or occupancy of a channel. The different contentions schemes may have different CCA periods, different backoff periods, and/or different backoff mechanisms. For example, during an initial phase of the contention resolution procedure, a device may perform a CCA for a predetermined duration. During the CCA, the device may compare the energy level detected in the channel to a threshold value. If the energy level exceeds the threshold, the device may determine that the channel is occupied, refrain from transmitting a signal, and repeat the CCA after a period of time, or the device may reduce its transmit power to avoid interfering with other devices that may be using the channel. If the energy level is below the threshold, the device may determine that the channel is unoccupied and proceed with transmitting a signal. The device may also detect reservation signals from other devices to determine if the channel is occupied. While contention resolution schemes facilitate communications on a channel, the schemes may prove inefficient. For example, a device may unnecessarily refrain from transmitting if it incorrectly determines that the channel is occupied, or may refrain from transmitting during a reservation period granted to a different device, even if the other device does not occupy the entire reservation period. And in contention resolution schemes where a device is to perform CCA before it can transmit on a channel, the device incurs the overhead of the CCA procedure even when the channel is clear for transmission.

Various devices operating in a shared spectrum, for example, IoT devices and/or IIOT devices, possess characteristics that can make contention resolution schemes particularly expensive in terms of the overhead required for a corresponding amount of data transmission. In this regard, the data transmissions related to those devices may be predictable, quasi-periodic, transmitted in short packets, and/or require less resources than other kinds of traffic. For instances, an IIOT device may be located in a factory and may upload measurement readings or reports to a network server at some preconfigured time. The network may also send controls to the IIOT device and/or monitor certain operations (e.g., energy usages and/or manufacturing procedures) at the IIOT device at certain time periods. The traffic may have strict delivery requirements, regardless of channel conditions, and without proper scheduling and/or contention resolution, may face high levels of interference and/or collisions. But the short transmissions typical of such devices means that contention resolution occupies a greater fraction of time relative to the length of the transmission than it does for other devices. In other words, existing contention resolution schemes impose significant overhead on such devices when they engage in contention resolution before transmitting a relatively small amount of data, especially when the devices need to transmit a small amount of data repeatedly over a given time period (e.g., due to a scheduled reporting interval, upon occurrence of an event/trigger, etc.). The overhead required may be dictated by the contention resolution scheme being used and include detecting preambles, reservation signals, and/or the presence of detectable energy.

The present disclosure describes mechanisms for allowing a device to obtain a semi-persistent reservation for resources in a shared network. According to aspects of the present disclosure, a device (e.g., a BS or UE) may contend for a time interlace consisting of a plurality (e.g., a series) of channel occupancy times (COTs) spaced apart in time. A device may use CCA, ECCA, a contention window 1 (CW1), a contention window 2 (CW2), a category 2 LBT, a category 3 LBT, a category 4 LBT, or any other scheme to contend for an interlace, including receiver-assisted schemes (e.g., receiver reservations by energy injection). The contention may be for downlink, uplink, mixed, and/or peer-to-peer traffic. Upon successful contention for the time interlace, the device may be granted exclusive access to the series of COTs without having to further contend for COTs in the series. In some instances, a reservation signal may be transmitted indicating that the time interlace is reserved for a specific device. The reservation signal may be transmitted by the device granted exclusive access to the time interlace or by another device (e.g., a receiving device) in communication with the device granted exclusive access.

The spacing between COTs in a time interlace may be predefined (e.g., based on a fixed period of time and/or pattern). The number of COTs in the series of the time interlace and/or a length of the time interlace may be fixed or variable. For example, in some instances the number of COTs in the series of the time interlace and/or the length of the time interlace may be dependent upon the contention resolution scheme utilized to win access to the time interlace. In this regard, a more robust contention resolution scheme may be associated with a larger number of COTs and/or a longer time interlace than a less robust contention resolution scheme. For example, a device using ECCA may be granted 8 COTs of a time interlace, while a device using a CCA may be granted 4 COTs of the time interlace. A device may also be granted more than one time interlace (e.g., 1, 2, 4, 8, or a different number of interlaces, which may be a number that was pre-agreed upon) based on the scheme used for contention resolution. A device using a more robust contention scheme (e.g., a scheme with greater overhead or monitoring) may be granted more interlaces than a device using a less robust contention scheme (e.g., a scheme with lesser overhead or monitoring). For example, a device using ECCA may be granted an interlace containing 4 interlaces, while a device using a CCA may be granted 1 interlace.

In some instances, the device granted exclusive access to a time interlace may free one or more COTs in the series of the time interlace for use by other devices. For example, the device may transmit a signal indicating it no longer requires the time interlace and/or a particular COT of the time interlace. The other devices may occupy the one or more unused COTs of the time interlace in response to receiving the signal.

In some aspects, the device may refrain from contending for any other interlaces after successfully obtaining an interlace. Alternately, the device may contend for other interlaces even after obtaining an interlace, and may hold multiple interlaces simultaneously. When contending for the other interlaces, the contention resolution process may be independent of the one used to obtain the first interlace. That is, the fact that the device holds the first interlace does not affect the likelihood of it being granted another interlace. The lengths (e.g., the number of COTs or the length of time of the reservation) of different interlaces may be different.

In some aspects, a device holding an interlace—or a device communicating with a device holding an interlace—may transmit a COT occupancy signal (COT-occupied signal) indicating that a particular COT in the interlace is occupied. The COT-occupied signal may be transmitted shortly before the COT or at the beginning of the COT. Devices that contended for the interlace but lost may monitor for the COT-occupied signal and occupy a COT that does not have an associated occupancy signal. The device holding the interlace may continue to occupy the remaining COTs even if a given COT was ceded by not transmitting an occupancy signal.

Aspects of the present disclosure can provide several benefits. For example, by avoiding the overhead of lengthy contention resolution schemes before transmissions, devices can communicate more efficiently with interference management among the devices. Devices may be less likely to delay or refrain from transmitting a signal in response to a false positive result from energy or reservation signal detection by using aspects of the present disclosure. Devices may also use resources that were reserved by or granted to another device, but where the other device completed its use of the resource sooner than the length of time for which it was allocated the resource, reducing inefficiency due to excess reservations or non-use of the entirety of reserved resources (e.g., not occupying a full COT or the full length of a reservation). Accordingly, spectrum utilization efficiency can also be improved. Additionally, the contention resolution overhead (e.g., contention slots, maximum contention window, countdowns, minimum duration of detectability) may be decoupled from the COT duration and traffic demand, making it possible to have low collision probabilities without incurring an overhead penalty. Licensed spectrum deployments, especially those with low delay and low latency requirements, may also benefit from interreference management based on reservation-based silencing of interferers.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs)

and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ a various contention resolution schemes, such as a listen-before-talk (LBT) procedure, to monitor for transmission opportunities (TXOPs) in the shared channel. A TXOP may also be referred to as channel occupancy time (COT). For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 2 (CAT2) LBT, a category 3 (CAT3) LBT, or a category 4 (CAT4) LBT. A CAT2 LBT refers to an LBT without a random backoff period. A CAT4 LBT refers to an LBT with a random backoff and a fixed-size contention window (CW). A CAT4 LBT refers to an LBT with a random backoff and a variable CW. A serving BS 105 may perform a CAT4 LBT to acquire a COT for communication with a UE. Additionally, the BS 105 may transmit a COT indication, for example, at the beginning of the COT, to indicate a duration of the COT and/or one or more subbands where the COT. The serving BS 105 may share the COT with a UE 115. To share the BS 105's COT, the UE may perform a CAT2 LBT within the BS 105's COT. Upon passing the CAT2 LBT, the UE may transmit a UL transmission within the BS 105's COT. A UE 115 may also acquire a COT outside of a COT of the serving BS105 for UL transmission by performing a CAT4 LBT. In some instances, the UE 115 may also share the UE 115's COT with the BS 105.

In some aspects a BS 105 and/or UE 105, may employ a semi-persistent reservation scheme and contend for a time interlace consisting of a series of COTs rather then performing an LBT or other contention resolution procedure for every desired COT. Upon successful contention for the time interlace, the BS 105 or UE 105 may be granted exclusive access to the series of COTs without having to further contend for COTs in the series. A BS 105 or UE 105 may also be granted more than one interlace at a time (e.g., 1, 2, 4, 8, or a different number of interlaces, which may be a number that was pre-agreed upon) based on the scheme used for contention. The BS 105 or UE 105 may transmit a reservation signal indicating it has been granted the time interlace(s). The reservation signal may include a request-to-send (RTS) signal, clear-to-send (CTS) signal, or CTS-to-self signal.

In some aspects, a BS 105 or UE 105 may refrain from contending for any other interlaces after successfully obtaining an interlace. Alternately, the BS 105 or UE 105 may contend for other interlaces even after obtaining an interlace, and may hold multiple interlaces-which may be of different lengths (e.g., number of COTs)—simultaneously.

In some aspects, a BS 105 or UE 105 holding an interlace—or another BS 105 or UE 105 communicating with the BS 105 or UE 105 holding an interlace—may transmit a signal indicating that a particular COT in the interlace is occupied shortly before the COT. A BS 105 or UE 105 which contended for the interlace but lost may monitor for the COT-occupied signal and occupy a COT which is not preceded by the occupancy signal. The device holding the interlace may continue to occupy the remaining COTs even if a given COT was ceded by not transmitting an occupancy signal.

Figure 2:
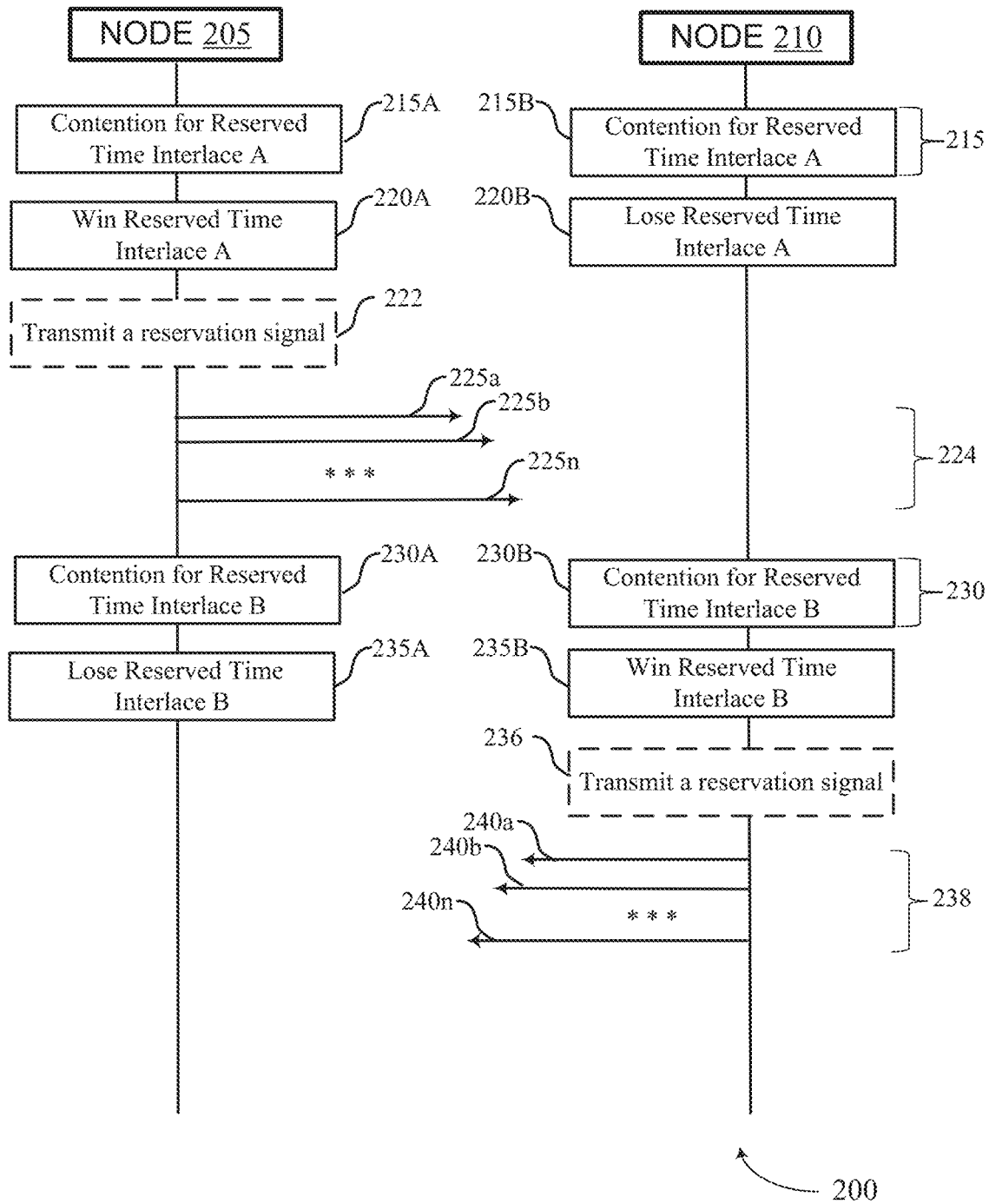
FIG. 2 illustrates an exemplary communication sequence according to aspects of the present disclosure.

FIG. 2 illustrates an exemplary communication sequence 200 according to aspects of the present disclosure. Aspects of the sequence 200 can be executed by a computing device (e.g., a processor, processing circuit, and/or other suitable component) of a wireless communication device or other suitable means for performing the steps. For example, a wireless communication device, such as the BS 105 of FIG. 1 or BS 500 of FIG. 5, or UE 115 of FIG. 1 or UE 600 of FIG. 6, may utilize one or more components of FIGS. 5 and 6, such as the processor 502 or 602, the memory 504 or 604, the semi-persistent reservation module 508 or 608, the transceiver 510 or 610, the modem 512 or 612, or the one or more antennas 516 or 616, to execute the operations of FIG. 2. In communication sequence 200, node 205 may be a BS 105 or UE 115 and node 210 may be a BS 105 or UE 115.

During contention period 215, node 205 is in contention for reserved time interlace A at 215A, and node 210B is in contention for reserved time interlace A at 215B. Nodes 205 and 210 may use any of the contention resolution schemes described above, including CCA, ECCA, a contention window 1 (CW1), a contention window 2 (CW2), a category 2 LBT, a category 3 LBT, a category 4 LBT, or another scheme to contend for interlace A.

At 220A, the contention may be resolved in favor of Node 205, which may win reserved time interlace A, and at 220B, node 210 may lose reserved time interlace A. Node 205 may be granted access to a series of COTs contained within interlace A and may not have to contend for the individual COTs.

At 222, node 205 may optionally transmit a reservation signal indicating it has been granted reserved time interlace A. In some instances, the reservation signal may be transmitted by another node (e.g., a receiving node) in communication with node 205. The reservation signal may include a request-to-send (RTS) signal, clear-to-send (CTS) signal, or CTS-to-self signal. Upon receiving the reservation signal, other nodes, such as node 210, may refrain from transmitting signals during COTs within the time interlace A, or from attempting to contend for COTs within time interlace A.

Node 205 may transmit numerous signals 225 during the period of time 224 corresponding to time interlace A. The signals 225 may be transmitted during COTs within interlace A in the manner described with respect to FIGS. 3 and 4. For example, signal 225a may be transmitted during the first COT of interlace A (e.g., COT1 314 of FIG. 3), signal 225b may be transmitted during the second COT of interlace A (e.g., COT2 318 of FIG. 3), and signal 225n may be transmitted during the nth COT of interlace A (e.g., COTn 326 of FIG. 3). During the period of time 224 corresponding to interlace A, node 210 may refrain from transmitting or contending for COTs within interlace A. Prior to the end of time period 224, node 205 may transmit a signal ending its reservation of interlace A, allowing other nodes, for example, node 210, to use COTs that were previously reserved for node 205 during interlace A.

Contention period 230 may occur before or after the period of time 224 corresponding to interlace A, or may overlap with time period 224. During contention period 230, node 205 and node 210 may again contend for a reserved time interlace, with node 205 in contention for reserved time interlace B at 230A, and node 210 in contention for reserved time interlace B at 230B. At 230A, node 205 may instead refrain from contending for interlace B in response to having won interlace A at 220A. If node 205 does contend for interlace B at 230A, the contention may be independent from node 205's contention for interlace A at 220A, that is, the likelihood of node 205 winning interlace B would not be affected by node 205 having won interlace A at 220A.

At 235B, node 210 may win the contention for time interlace B, and at 235A, node 205 may lose.

At 236, having won contention for interlace B at 235B, node 210 may optionally transmit a reservation signal indicating it has been granted reserved time interlace B. In some instances, the reservation signal may be transmitted by another node (e.g., a receiving node) in communication with node 210. The reservation signal may include a request-to-send (RTS) signal, a clear-to-send (CTS) signal, or CTS-to-self signal. Upon receiving the reservation signal, other nodes, such as node 205, may refrain from transmitting signals during COTs within the time interlace A, or from attempting to contend for COTs within time interlace A.

Node 210 may transmit numerous signals 240 during the period of time 238 corresponding to time interlace B. The signals 240 may be transmitted during COTs within interlace B in the manner described with respect to FIGS. 3 and 4. For example, signal 240a may be transmitted during the first COT of interlace B (e.g., COT1 314 of FIG. 3), signal 240b may be transmitted during the second COT of interlace B (e.g., COT2 318 of FIG. 3), and signal 240n may be transmitted during the nth COT of interlace B (e.g., COTn 326 of FIG. 3). During the period of time 238 corresponding to interlace B, node 205 may refrain from transmitting or contending for COTs within interlace A. Prior to the end of time period 238, node 210 may transmit a signal ending its reservation of interlace B, allowing other nodes, for example, node 205, to use COTs that were previously reserved for node 210 during interlace B.

Figure 3:
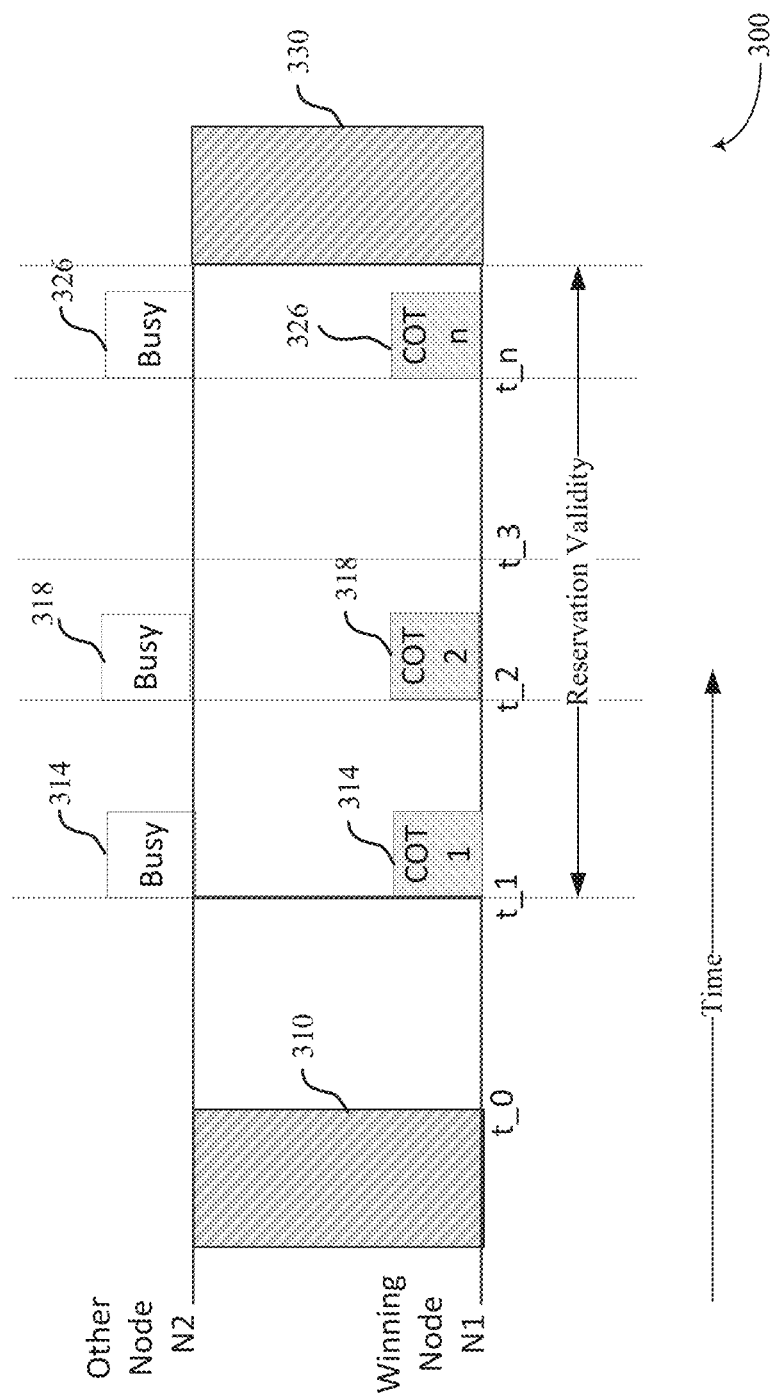
FIG. 3 illustrates a wireless communication method according to some aspects of the present disclosure.

FIG. 3 illustrates a wireless communication method 300 according to some aspects of the present disclosure. Aspects of the method 300 can be executed by a computing device (e.g., a processor, processing circuit, and/or other suitable component) of a wireless communication device or other suitable means for performing the steps. For example, a wireless communication device, such as a BS 105 or 500, or UE 115 or 600, may utilize components discussed below in FIG. 6 to execute the steps of method 300. Alternatively, a wireless communication device, such as the BS 105 or 500 may utilize components discussed below in FIG. 5 to execute the steps of method 300. The method 300 may be employed by nodes, such as the BSs 105 and/or 500, the UEs 115 and/or 600, contending for access in a channel. The nodes may have a common understanding of timing or reference time. The common timing or reference time may be in any suitable time unit or granularity. Time in FIG. 3 may be measured in an arbitrary unit, for example, symbols, slots, frames, or converged pseudo-sync based on COT ending boundary alignment.

During contention period 310, nodes N1 and N2 are in contention for a reserved time interlace. Nodes N1 and N2 may use any of the contention resolution schemes described above, including CCA, ECCA, a contention window 1 (CW1), a contention window 2 (CW), a category 2 LBT, a category 3 LBT, a category 4 LBT, or another scheme to contend for the interlace.

At time t_0, at the end of the contention period, node N1 having won the contention is granted the interlace, which has the effect of granting every COT within the interlace to N1. The interlace has a duration t_n-t_1 (the reservation validity period) and includes COTs 1-n. The COTs may be spaced periodically according to the equation $t\_n = t\_0 + n*\Delta$, where n is the COT number (e.g., 3 for COT 3—the third COT in the interlace-if the first COT is at t_i) and $\Delta$ is the time offset between COTs. The number of COTs n within the interlace may be pre-determined or may depend on the scheme used for contention resolution. For example, a device using a contention scheme with greater overhead (e.g., a longer channel assessment or monitoring duration) may be granted more interlaces than a device using a scheme with lesser overhead. For example, a device using ECCA with a long CCA duration may be granted an interlace containing 4 interlaces, while a device using a category 2 LBT (e.g., one-shot LBT with a single channel energy measurement) may be granted 1 interlace.

At the end of the contention period 310, node N1 may optionally transmit a reservation signal, which may include a request-to-send (RTS) signal, clear-to-send (CTS) signal, or CTS-to-self signal, indicating that it has been granted the interlace. In some instances, node N1 may send a RTS signal and a node in communication with the node N1 may send a CTS signal. The reservation signals RTS, CTS, or CTS-to-self signals may serve to silence other nodes contending for access to the channel.

Time t_1 marks the start of COT1 314, which is reserved for node N1 as a result of the contention resolution. Node N1 may communicate (transmit and/or receive) signals, e.g., signals 225 as in FIG. 2, with one or more other nodes for the duration of COT1 314, but may cease transmitting and/or receiving signals at the conclusion of COT1 314. During COT1 314, node N2 is aware that COT1 314 is reserved for node N1 and may not transmit during or attempt to contend for COT1 314.

Time t_2 marks the start of COT2 318, which is likewise reserved for node N1 as a result of the contention resolution. Node N1 may communicate (transmit and/or receive) signals, e.g., signals 225 as in FIG. 2, for the duration of COT2 318, but may cease transmitting signals at the conclusion of COT2 318. Node N2 is aware that COT2 318 is reserved for N1 and will not transmit during or attempt to contend for COT2 318.

Time t_n marks the start of COTn 326, which is likewise reserved for node N1 as a result of the contention resolution. Node N1 may communicate (transmit and/or receive) signals, e.g., signals 225 as in FIG. 2, for the duration of COTn 326, but may cease transmitting signals at the conclusion of COTn 326. Node N2 is aware that COTn 326 is reserved for node N1 and may not transmit during or attempt to contend for COTn 326.

After the end of the reservation validity period, nodes N1 and N2 may again contend for a time interlace during contention resolution period 330, as they did during contention resolution period 310.

In some aspects, the time interlace timings are preconfigured. For instance, the time t_0, t_1, t_2, t_3, . . . t_n, and/or the periodicity A for the time interlace are known to nodes (e.g., nodes N1 and N2) in the network. In some aspects, the network (e.g., a BS 105 or 500) may configure the nodes with time interlace timing information.

Figure 4:
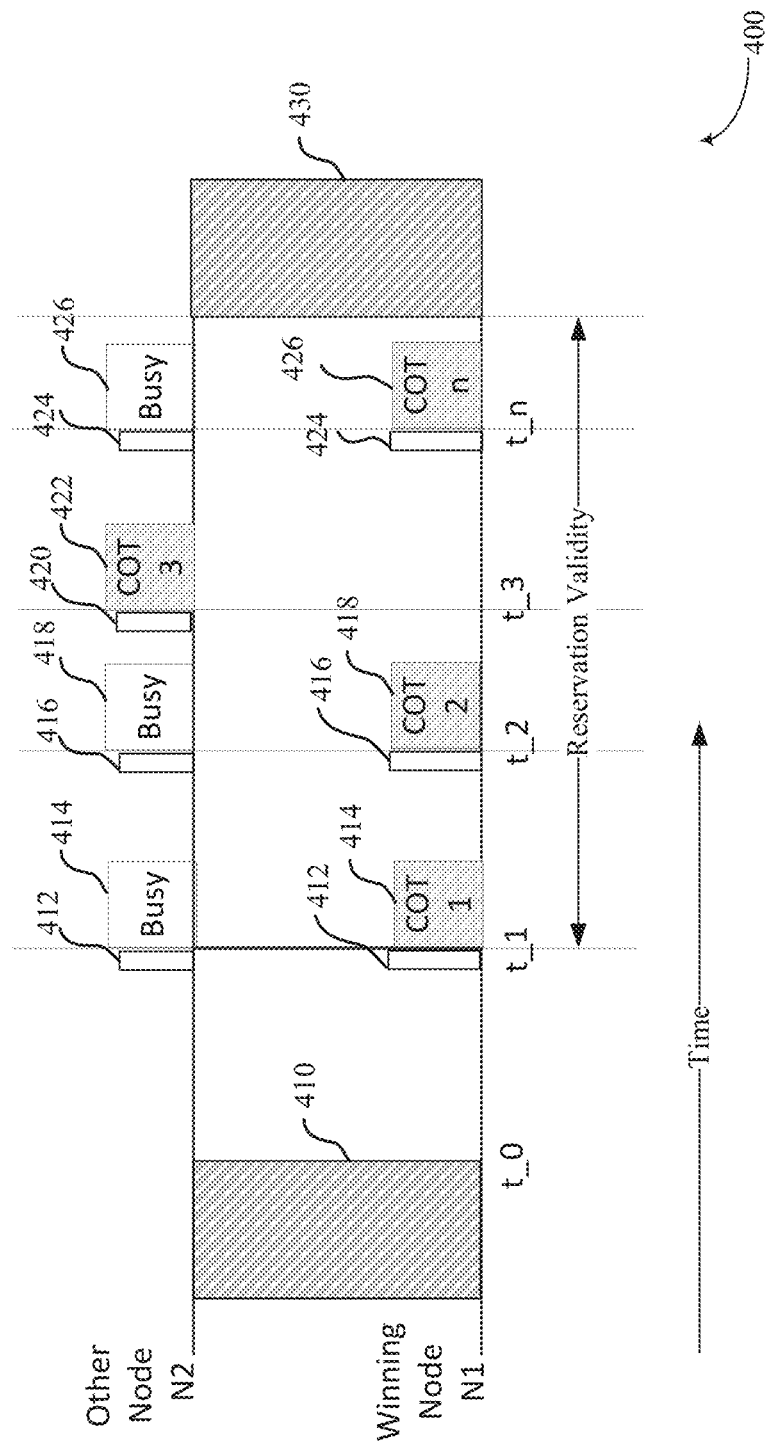
FIG. 4 illustrates a wireless communication method according to some aspects of the present disclosure.

FIG. 4 illustrates a wireless communication method 400 according to some aspects of the present disclosure. Aspects of the method 400 can be executed by a computing device (e.g., a processor, processing circuit, and/or other suitable component) of a wireless communication device or other suitable means for performing the steps. For example, a wireless communication device such as a BS 105 or 500, or a UE 115 or 600, may utilize components as will be discussed further below in FIG. 6, to execute the steps of method 400. Alternatively, a wireless communication device, such as the BS 105 or 500 may utilize components as will be discussed further below in FIG. 5, to execute the steps of method 400. The method 400 may be employed by nodes, such as the BSs 105 and/or 500, the UEs 115 and/or 600, contending for access in a channel. The nodes may have a common understanding of timing or reference time. The common timing or reference time may be in any suitable time unit or granularity. Time in FIG. 4 may be measured in an arbitrary unit, for example, symbols, slots, frames, or converged pseudo-sync based on COT ending boundary alignment.

During contention period 410, nodes N1 and N2 are in contention for a reserved time interlace. Nodes N1 and N2 may use any of the contention resolution schemes described above, including CCA, ECCA, a contention window 1 (CW1), a contention window 2 (CW), a category 2 LBT, a category 3 LBT, a category 4 LBT, or another scheme to contend for the interlace.

At time t_0, at the end of the contention period, node N having won the contention is granted the interlace, which has the effect of granting every COT within the interlace to N1. The interlace has duration t_n-t_1 (the reservation validity period) and includes COTs 1-n. The COTs may be spaced periodically according to the equation $t\_n = t\_0 + n*\Delta$, where n is the COT number (e.g., 3 for COT 3—the third COT in the interlace-if the first COT is at t_1) and Δ is the time offset between COTs. The number of COTs n within the interlace may be pre-determined, or may depend on the scheme used for contention resolution. For example, a device using a contention scheme with greater overhead (e.g., a longer channel assessment or monitoring duration) may be granted more interlaces than a device using a scheme with lesser overhead. For example, a device using ECCA may be granted an interlace containing 4 interlaces, while a device using a category 2 LBT may be granted 1 interlace.

Just prior to every COT within the interlace, node N1 may transmit a COT-occupied signal indicating that it will occupy the COT following the COT-occupied signal. In some instances, the COT-occupied signal may be a predetermined waveform sequence. In some instances, the COT-occupied signal may carry COT information. Node N2 may listen for the COT-occupied signal, and if it detects the signal, it may refrain from transmitting or contending for the COT. If node N2 does not detect the COT-occupied signal, it may assume that COT is free for use and transmit during the COT, or contend for the COT with a node other than N1.

Time t_1 marks the start of COT1 414, which is reserved for node N1 as a result of the contention resolution. Node N1 may transmit signals, e.g., signals 225 as in FIG. 2, for the duration of COT1 414, but may cease transmitting signals at the conclusion of COT1 414. Just prior to COT1 414, node N1 may transmit a COT-occupied signal during period 412, which may be detected by N2. As a result, N2 is aware that COT1 414 is occupied by N1 and may not transmit during or attempt to contend for COT1 414.

Time t_2 marks the start of COT2 418, which is reserved for node N1 as a result of the contention resolution. Node N1 may communicate (transmit and/or receive) signals, e.g., signals 225 as in FIG. 2, for the duration of COT2 418, but may cease transmitting signals at the conclusion of COT2 418. Just prior to COT2 418, node N1 may transmit a COT-occupied signal during period 416, which may be detected by node N2. As a result, node N2 is aware that COT2 418 is occupied by N1 and may not transmit during or attempt to contend for COT2 418.

Time t_3 marks the start of COT3 422, which is reserved for node N1 as a result of the contention resolution. Here, node N1 does not transmit a COT-occupied signal during period 420, so node N2 assumes that COT3 422 is free for use, and may transmit signals during COT3. Node N1 refrains from transmitting and effectively cedes COT3. In situations where there are more than two nodes N1 and N2 contending for resources, node N2 may participate in contention resolution for COT3 with other nodes.

Time t_n marks the start of COTn 426, which is reserved for node N1 as a result of the contention resolution. Node N1 may communicate (transmit and/or receive) signals, e.g., signals 225 as in FIG. 2, for the duration of COTn 426, but may cease transmitting signals at the conclusion of COTn 426. Just prior to COTn 426, node N may again transmit a COT-occupied signal during period 424, which may be detected by N2. As a result, N2 is aware that COTn 426 is occupied by N1 and may not transmit during or attempt to contend for COTn 426.

After the end of the reservation validity period, nodes N1 and N2 may again contend for a time interlace during contention resolution period 430, as they did during contention resolution period 410.

In some aspects, the time interlace timings are preconfigured. For instance, the time t_0, t_1, t_2, t_3, . . . t_n, and/or the periodicity A for the time interlace are known to nodes (e.g., nodes N1 and N2) in the network. In some aspects, the network (e.g., a BS 105 or 500) may configure the nodes with time interlace timing information.

Figure 5:
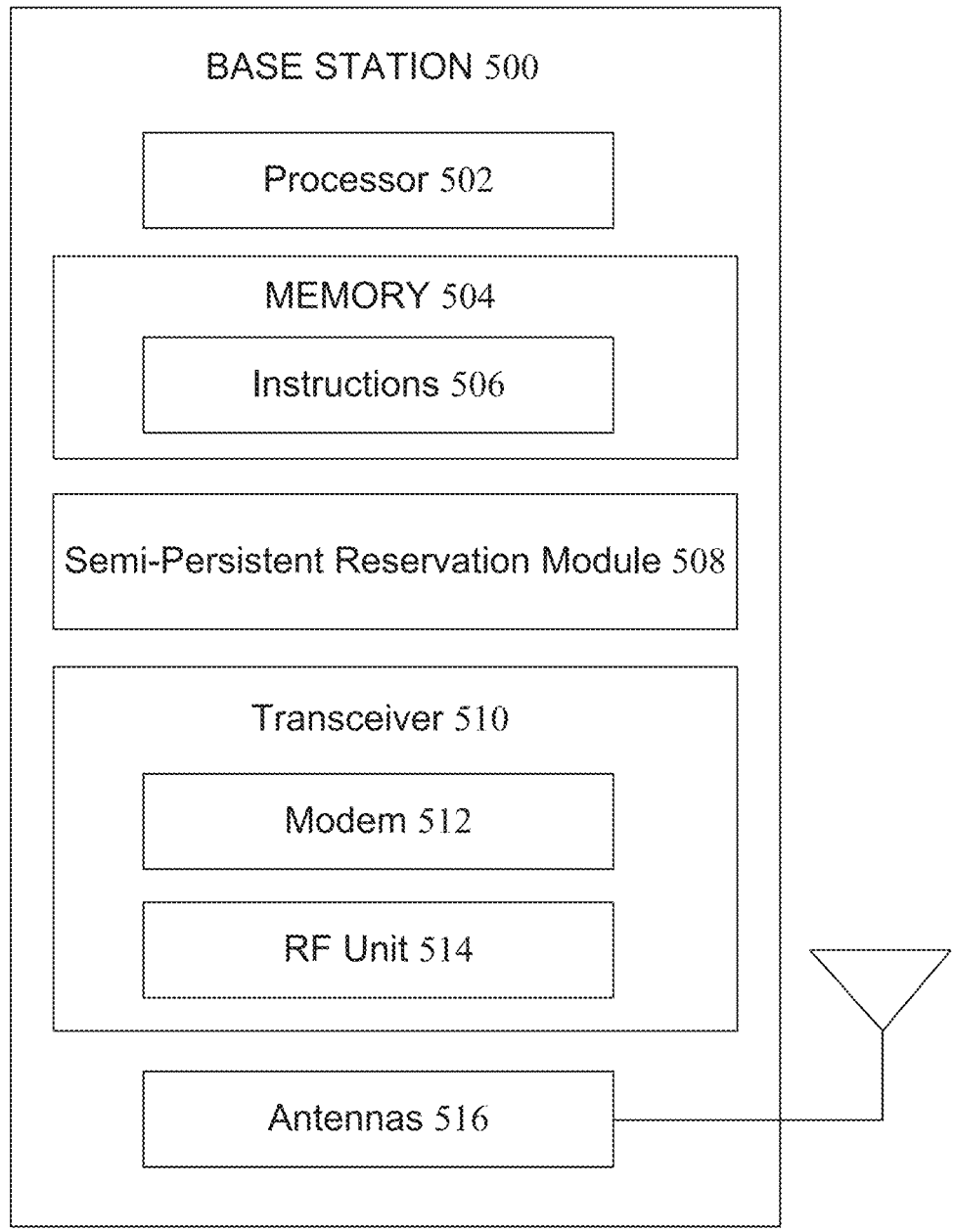
FIG. 5 is a block diagram of an exemplary user equipment (UE) according to some aspects of the present disclosure.

FIG. 5 is a block diagram of an exemplary BS 500 according to some aspects of the present disclosure. The BS 500 may be a BS 105 in the network 100 as discussed above in FIG. 1. As shown, the BS 500 may include a processor 502, a memory 504, a semi-persistent reservation module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 4-9. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The semi-persistent reservation module 508 may be implemented via hardware, software, or combinations thereof. For example, the semi-persistent reservation module 508 may be implemented as a processor, circuit, and/or instructions 506 stored in the memory 504 and executed by the processor 502. In some examples, the semi-persistent reservation module 508 can be integrated within the modem subsystem 512. For example, the semi-persistent reservation module 508 can be implemented by a combination of software components (e.g., executed by a DSP or a general processor) and hardware components (e.g., logic gates and circuitry) within the modem subsystem 512.

The semi-persistent reservation module 508 may be used for various aspects of the present disclosure, for example, aspects of FIGS. 2-4 and 7-8. The semi-persistent reservation module 508 is configured to obtain a semi-persistent reservation for resources in a shared network. The semi-persistent reservation module 508 may contend for a reserved time interlace consisting of a series of COTs using CCA, ECCA, CW1, CW2, a category 2 LBT, a category 3 LBT, a category 4 LBT, or other contention scheme. Upon successful contention for the time interlace by semi-persistent reservation module 508, the BS 500 may be granted exclusive access to the series of COTs without having to further contend for COTs in the series. The semi-persistent reservation module 508 may transmit a reservation signal indicating it has been granted the time interlace. The reservation signal may include a request-to-send (RTS) signal, clear-to-send (CTS) signal, or CTS-to-self signal. The semi-persistent reservation module 508 may also transmit a COT-occupied signal shortly before each COT it intends to occupy. The semi-persistent reservation module 508 may free subsequent COTs in the series for use by other devices by transmitting a signal indicating it no longer requires the time interlace, or free individual COTs by refraining from transmitting a COT-occupied signal. The semi-persistent reservation module 508 may refrain from contending for any other interlaces after successfully obtaining an interlace, or alternately, it may contend for other interlaces even after obtaining an interlace, and may hold multiple interlaces simultaneously.

If the semi-persistent reservation module 508 does not win the contention resolution procedure, it may monitor for a reservation signal from the device which won the contention resolution procedure, and refrain from transmitting during or contending for COTs within the interlace which it sought. The semi-persistent reservation module 508 may also monitor for COT-occupied signals from the winning device shortly before each COT. If it does not detect a COT-occupied signal, it may assume the COT is unoccupied and transmit signals during the COT, or contend with other devices for the COT.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., PDSCH signal, PDCCH signal, DL data, scheduling grants, RRC configurations, COT-occupied signal, reservation signal, time interlace configuration, contention parameters and/or rules for contending a time interlace) from the modem subsystem 512 (on outbound transmissions) or of transmissions originating from another source such as a UE 115 and/or UE 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to some aspects of the present disclosure. The antennas 516 may further receive data messages transmitted from other devices and provide the received data messages for processing and/or demodulation at the transceiver 510. The transceiver 510 may provide the demodulated and decoded data (e.g., PUSCH signal, PUCCH signal, UL data, UL control information, COT-occupied signal, reservation signal) to the semi-persistent reservation module 508 and configured transmission module 508 for processing. The antennas 516 may include multiple antennas of similar or different designs in order to sustain multiple transmission links.

In an aspect, the processor 502 is configured to coordinate with the semi-persistent reservation module 508 to contend for a time interlace in a channel. The transceiver 510 is configured to coordinate with the semi-persistent reservation module 508 to transmit reservation signals and COT-occupied signals to other devices.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6:
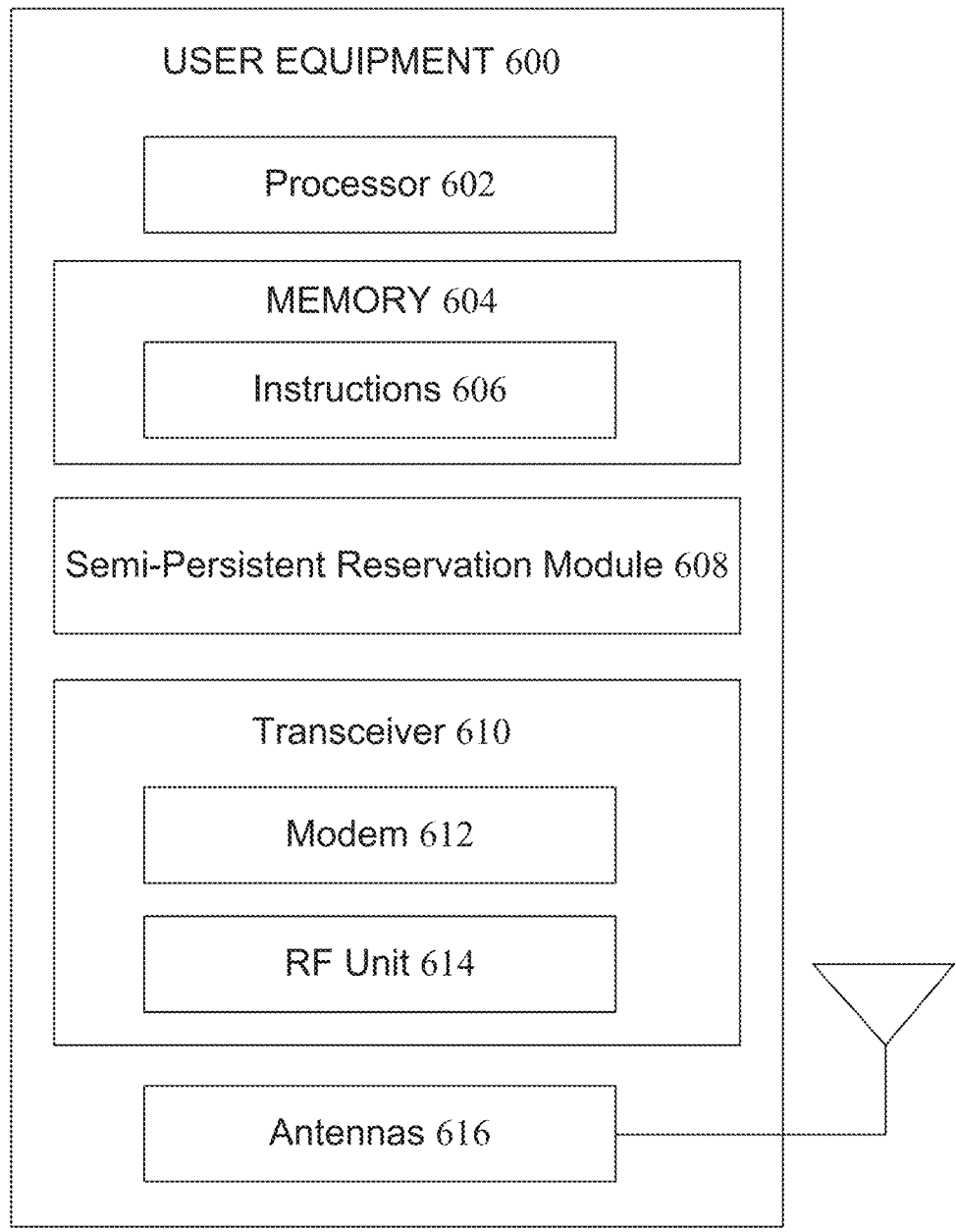
FIG. 6 is a block diagram of an exemplary base station (BS) according to some aspects of the present disclosure.

FIG. 6 is a block diagram of an exemplary UE 600 according to some aspects of the present disclosure. The UE 600 may be a UE 115 discussed above in FIG. 1. As shown, the UE 600 may include a processor 602, a memory 604, an semi-persistent reservation module 608, a transceiver 610 including a modem subsystem 612 and a radio frequency (RF) unit 614, and one or more antennas 616. These elements may be in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 604 includes a non-transitory computer-readable medium. The memory 604 may store, or have recorded thereon, instructions 606. The instructions 606 may include instructions that, when executed by the processor 602, cause the processor 602 to perform the operations described herein with reference to the UEs 115 in connection with aspects of the present disclosure, for example, aspects of FIGS. 4-9. Instructions 606 may also be referred to as program code, which may be interpreted broadly to include any type of computer-readable statement(s) as discussed above with respect to FIG. 5.

The semi-persistent reservation module 608 may be implemented via hardware, software, or combinations thereof. For example, the semi-persistent reservation module 608 may be implemented as a processor, circuit, and/or instructions 606 stored in the memory 604 and executed by the processor 602. In some examples, the semi-persistent reservation module 608 can be integrated within the modem subsystem 612. For example, the semi-persistent reservation module 608 can be implemented by a combination of software components (e.g., executed by a DSP or a general processor) and hardware components (e.g., logic gates and circuitry) within the modem subsystem 612.

The semi-persistent reservation module 608 may be used for various aspects of the present disclosure, for example, aspects of FIGS. 2-4 and 7-8. The semi-persistent reservation module 608 is configured to obtain a semi-persistent reservation for resources in a shared network. The semi-persistent reservation module 608 may contend for a reserved time interlace consisting of a series of COTs using CCA, ECCA, CW1, CW2, a category 2 LBT, a category 3 LBT, a category 4 LBT, or other contention scheme. Upon successful contention for the time interlace by semi-persistent reservation module 608, the UE 600 may be granted exclusive access to the series of COTs without having to further contend for COTs in the series. The semi-persistent reservation module 608 may transmit a reservation signal, which may include a request-to-send (RTS) signal, a clear-to-send (CTS) signal, or CTS-to-self signal, indicating it has been granted the time interlace.

The semi-persistent reservation module 608 may also transmit a COT-occupied signal shortly before each COT it intends to occupy. The semi-persistent reservation module 608 may free subsequent COTs in the series for use by other devices by transmitting a signal indicating it no longer requires the time interlace, or free individual COTs by refraining from transmitting a COT-occupied signal. The semi-persistent reservation module 608 may refrain from contending for any other interlaces after successfully obtaining an interlace, or alternately, it may contend for other interlaces even after obtaining an interlace, and may hold multiple interlaces simultaneously.

If the semi-persistent reservation module 608 does not win the contention resolution procedure, it may monitor for a reservation signal from the device which won the contention resolution procedure, and refrain from transmitting during or contending for COTs within the interlace which it sought. The semi-persistent reservation module 608 may also monitor for COT-occupied signals from the winning device shortly before each COT. If it does not detect a COT-occupied signal, it may assume the COT is unoccupied and transmit signals during the COT, or contend with other devices for the COT.

As shown, the transceiver 610 may include the modem subsystem 612 and the RF unit 614. The transceiver 610 can be configured to communicate bi-directionally with other devices, such as the BSs 105. The modem subsystem 612 may be configured to modulate and/or encode the data from the memory 604 and/or the configured transmission module 507 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., PUSCH signal, PUCCH signal, UL data, UL control information, COT-occupied signal, reservation signal) from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together at the UE 115 to enable the UE 115 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The transceiver 610 may provide the demodulated and decoded data (e.g., PDSCH signal, PDCCH, DL data, DL control information, RRC configuration, COT-occupied signal, reservation signal, time interlace configuration, contention parameters and/or rules for contending a time interlace) to the configured transmission module 507 for processing. The antennas 616 may include multiple antennas of similar or different designs in order to sustain multiple transmission links. The RF unit 614 may configure the antennas 616.

In an aspect, the processor 602 is configured to coordinate with the semi-persistent reservation module 608 to contend for a time interlace in the channel. The transceiver 610 is configured to coordinate with the semi-persistent reservation module 608 to transmit reservation signals and COT-occupied signals to other devices.

In an aspect, the UE 600 can include multiple transceivers 610 implementing different RATs (e.g., NR and LTE). In an aspect, the UE 600 can include a single transceiver 610 implementing multiple RATs (e.g., NR and LTE). In an aspect, the transceiver 610 can include various components, where different combinations of components can implement different RATs.

Figure 7:
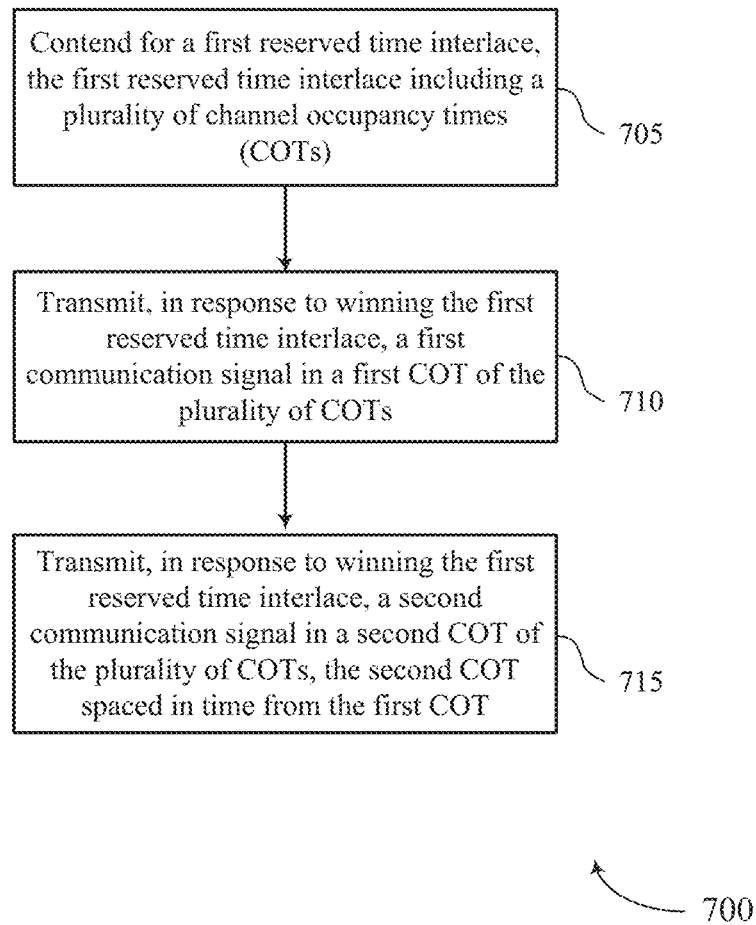
FIG. 7 is a flow diagram of a communication method according to some aspects of the present disclosure.

FIG. 7 is a flow diagram of a communication method according to some aspects of the present disclosure. Aspects of the method 700 can be executed by a computing device (e.g., a processor, processing circuit, and/or other suitable component) of a wireless communication device or other suitable means for performing the steps. For example, a wireless communication device, such as the UE 115 or 600 or BS 105 or 500, may utilize one or more components, such as the processor 502 or 602, the memory 504 or 604, the semi-persistent reservation module 508 or 608, the transceiver 510 or 610, the modem 512 or 612, or the one or more antennas 516 or 616, to execute the steps of method 700. As illustrated, the method 700 includes several enumerated steps, but aspects of the method 700 may include additional steps before, after, and in between the enumerated steps. In some aspects, one or more of the enumerated steps may be omitted or performed in a different order.

At block 705, a first wireless communication device, which may be a BS 105 or 500, or a UE 115 or 600, contends for a first reserved time interlace, the first reserved time interlace including a plurality of COTs. The device may contend for the interlace using clear channel assessment (CCA), extended clear channel assessment (ECCA), contention window 1 (CW1), contention window 2 (CW2), category 2 listen-before-talk (LBT), category 3 LBT, or category 4 LBT, or other contention resolution scheme. If the device wins the first reserved time interlace, it may refrain from contending for a second-different-reserved time interlace. Alternately, the device could contend for a second-different-reserved time interlace even after winning the first time interlace. The device may utilize one or more components, such as the processor 502 or 602, the memory 504 or 604, and the semi-persistent reservation module 508 or 608 to contend for the interlaces. The device may use different contention techniques when contending for the first and second reserved time interlaces, and the different contention techniques may be associated with different interlace lengths. In other words, if the device wins the first interlace and the second interlace using different techniques, the length of the first interlace may be different than the length of the second interlace. Interlace length may be defined in terms of number of COTs within the interlace and/or in terms of the total length of time occupied by the interlace. After winning the first (or any) interlace, the device may transmit a reservation signal indicating that the interlace has been successfully reserved by the device. The reservation signal may include a request-to-send (RTS) signal, a clear-to-send (CTS) signal, or CTS-to-self signal. The device may utilize one or more components, such as the processor 502 or 602, the memory 504 or 604, the semi-persistent reservation module 508 or 608, the transceiver 510 or 610, the modem 512 or 612, or the one or more antennas 516 or 616 to transmit the reservation signal. The operations of 705 may be performed according to the methods described herein.

At block 710, the device may transmit, in response to winning the first reserved time interlace, a first communication signal in a first COT of the plurality of COTs. Prior to transmitting the first communication signal, the device may also transmit a first COT occupancy signal associated with the first COT. The device may utilize one or more components, such as the processor 502 or 602, the memory 504 or 604, the semi-persistent reservation module 508 or 608, the transceiver 510 or 610, the modem 512 or 612, or the one or more antennas 516 or 616 to transmit the first communication signal and the first COT occupancy signal. The operations of 710 may be performed according to the methods described herein.

At block 715, the device may transmit, in response to winning the first reserved time interlace, a second communication signal in a second COT of the plurality of COTs, the second COT spaced in time from the first COT. Prior to transmitting the second communication signal, the device may also transmit a second COT occupancy signal associated with the first COT. The device may utilize one or more components, such as the processor 502 or 602, the memory 504 or 604, the semi-persistent reservation module 508 or 608, the transceiver 510 or 610, the modem 512 or 612, or the one or more antennas 516 or 616 to transmit the second communication signal and the second COT occupancy signal. The operations of 715 may be performed according to the methods described herein.

In some instances, the device may refrain from transmitting a third COT occupancy signal associated with the third COT, which may indicate that the device has determined not to transmit a signal in the third COT. The device may utilize one or more components, such as the processor 502 or 602, the memory 504 or 604, and the semi-persistent reservation module 508 or 608 to refrain from transmitting the third COT occupancy signal.

Figure 8:
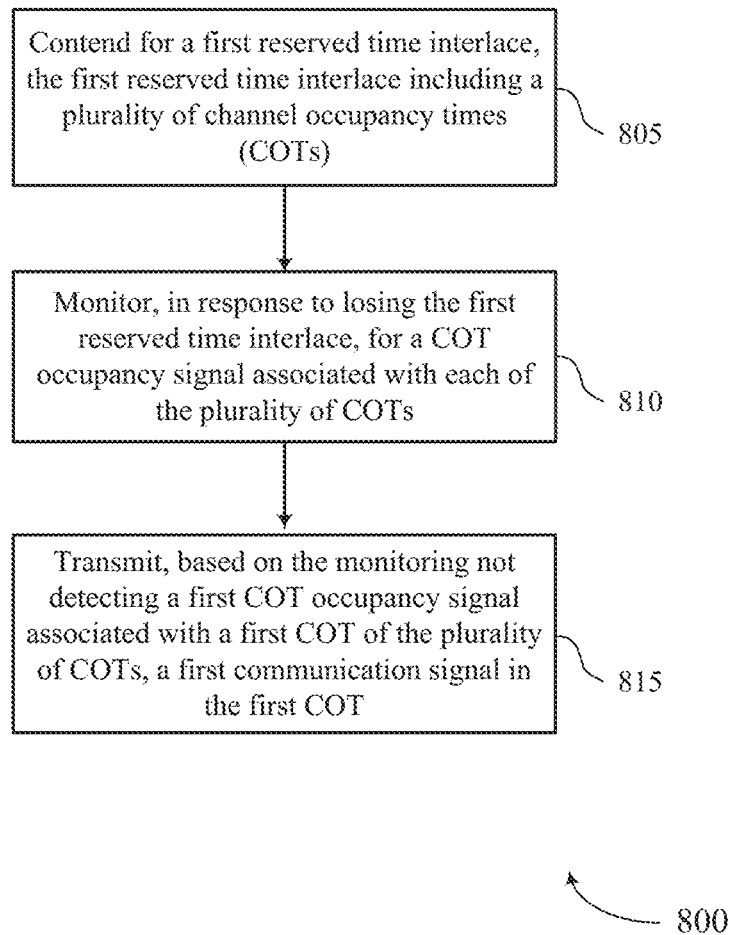
FIG. 8 is a flow diagram of a communication method according to some aspects of the present disclosure.

FIG. 8 is a flow diagram of a communication method according to some aspects of the present disclosure. Aspects of the method 800 can be executed by a computing device (e.g., a processor, processing circuit, and/or other suitable component) of a wireless communication device or other suitable means for performing the steps. For example, a wireless communication device, such as the UE 115 or 600 or BS 105 or 500, may utilize one or more components, such as the processor 502 or 602, the memory 504 or 604, the semi-persistent reservation module 508 or 608, the transceiver 510 or 610, the modem 512 or 612, or the one or more antennas 516 or 616, to execute the steps of method 800. As illustrated, the method 800 includes several enumerated steps, but aspects of the method 800 may include additional steps before, after, and in between the enumerated steps. In some aspects, one or more of the enumerated steps may be omitted or performed in a different order.

At block 805, a first wireless communication device, which may be a BS 105 or 500, or a UE 115 or 600, contends for a first reserved time interlace, the first reserved time interlace including a plurality of COTs. The device may contend for the interlace using clear channel assessment (CCA), extended clear channel assessment (ECCA), contention window 1 (CW1), contention window 2 (CW2), category 2 listen-before-talk (LBT), category 3 LBT, or category 4 LBT, or other contention resolution scheme. The device may contend for a second—different—reserved time interlace, and it may do so in response to losing the first reserved time interlace. The device may utilize one or more components, such as the processor 502 or 602, the memory 504 or 604, and the semi-persistent reservation module 508 or 608 to contend for the interlaces. After losing the first reserved time interlace, the device may receive a first reservation signal indicating a reservation of the first reserved time interlace by a second wireless communication device. The reservation signal may include a request-to-send (RTS) signal, clear-to-send (CTS) signal, or CTS-to-self signal, and may be received from the second wireless communication device, or from a third wireless communication device that is in communication with the second wireless communication device. The device may utilize one or more components, such as the processor 502 or 602, the memory 504 or 604, the semi-persistent reservation module 508 or 608, the transceiver 510 or 610, the modem 512 or 612, or the one or more antennas 516 or 616 to receive the reservation signal. The operations of 805 may be performed according to the methods described herein.

At block 810, the first wireless communication device may monitor, in response to losing the first reserved time interlace, for a COT occupancy signal associated with each of the plurality of COTs. The device may utilize one or more components, such as the processor 502 or 602, the memory 504 or 604, the semi-persistent reservation module 508 or 608, the transceiver 510 or 610, the modem 512 or 612, or the one or more antennas 516 or 616 to monitor for the COT occupancy signal. The operations of 810 may be performed according to the methods described herein.

At block 815, the first wireless communication device may transmit, based on the monitoring not detecting a first COT occupancy signal associated with a first COT of the plurality of COTs, a first communication signal in the first COT. The device may utilize one or more components, such as the processor 502 or 602, the memory 504 or 604, the semi-persistent reservation module 508 or 608, the transceiver 510 or 610, the modem 512 or 612, or the one or more antennas 516 or 616 to monitor for the second COT occupancy signal and transmit the first communication signal. The operations of 815 may be performed according to the methods described herein.

In some instances, the first wireless communication device may receive, based on the monitoring, a second COT occupancy signal associated with a second COT of the plurality of COTs, and refrain, based on the receiving the second COT occupancy signal, from transmitting during the second COT. The first wireless communication device may receive the second COT occupancy signal from a second wireless communication device that won the first reserved time interlace, or it may receive the second COT occupancy signal from a third wireless communication device in communication with the device that won the first reserved time interlace. The first wireless communication device may utilize one or more components, such as the processor 502 or 602, the memory 504 or 604, the semi-persistent reservation module 508 or 608, the transceiver 510 or 610, the modem 512 or 612, or the one or more antennas 516 or 616 to receive the second COT occupancy signal.

Further embodiments of the present disclosure include a non-transitory computer-readable medium having program code recorded thereon. The non-transitory computer-readable medium includes code for causing a first wireless communication device to contend for a first reserved time interlace, the first reserved time interlace including a plurality of COTs, code for causing the first wireless communication device to transmit, in response to winning the first reserved time interlace, a first communication signal in a first COT of the plurality of COTs, and code for causing the first wireless communication device to transmit, in response to winning the first reserved time interlace, a second communication signal in a second COT of the plurality of COTs, the second COT spaced in time from the first COT.

The non-transitory computer-readable medium may also include one or more of the following features. For instance, the non-transitory computer-readable medium includes code for causing the first wireless communication device to contend for a second reserved time interlace, the second reserved time interlace being different than the first reserved time interlace. The non-transitory computer-readable medium includes code for causing the first wireless communication device to refrain, in response to winning the first reserved time interlace, from contending for a second reserved time interlace, the second reserved time interlace being different than the first reserved time interlace. The code for causing the first wireless communication device to contend for the first reserved time interlace includes code for causing the first wireless communication device to contend for the first reserved time interlace using a first contention technique, wherein the first contention technique is associated with a first length of the first reserved time interlace and a second contention technique is associated with a second length of the first reserved time interlace, the second length being different than the first length. The code for causing the first wireless communication device to contend for the first reserved time interlace using the first contention technique includes code for causing the first wireless communication device to contend for the first reserved time interlace using at least one of a clear channel assessment (CCA), an extended clear channel assessment (ECCA), a contention window 1 (CW1), a contention window 2 (CW2), a category 2 listen-before-talk (LBT), a category 3 LBT, or a category 4 LBT. The first length includes a first number of COTs and the second length includes a second number of COTs, the second number of COTs being different than the first number of COTs. The first length includes a first length of time and the second length includes a second length of time, the second length of time being different than the first length of time. The non-transitory computer-readable medium includes code for causing the first wireless communication device to transmit a first COT occupancy signal associated with the first COT and code for causing the first wireless communication device to transmit a second COT occupancy signal associated with the second COT. The non-transitory computer-readable medium includes code for causing the first wireless communication device to refrain from transmitting a third COT occupancy signal associated with a third COT of the plurality of COTs. The non-transitory computer-readable medium includes code for causing the first wireless communication device to determine not to transmit data within the third COT. The non-transitory computer-readable medium includes code for causing the first wireless communication device to transmit, in response to winning the first reserved time interlace, a first reservation signal indicating a reservation of the first reserved time interlace by the first wireless communication device. The code for causing the first wireless communication device to transmit the first reservation signal includes at least one of code for causing the first wireless communication device to transmit a request-to-send (RTS) signal, code for causing the first wireless communication device to transmit a clear-to-send (CTS) signal, or code for causing the first wireless communication device to transmit a CTS-to-self signal. The first wireless communication device includes a base station. The first wireless communication device includes a UE.

Further embodiments of the present disclosure include a non-transitory computer-readable medium having program code recorded thereon. The non-transitory computer-readable medium includes code for causing a first wireless communication device to contend for a first reserved time interlace, the first reserved time interlace including a plurality of COTs, code for causing the first wireless communication device to monitor, in response to losing the first reserved time interlace, for a COT occupancy signal associated with each of the plurality of COTs, and code for causing the first wireless communication device to transmit, based on the monitoring not detecting a first COT occupancy signal associated with a first COT of the plurality of COTs, a first communication signal in the first COT.

The non-transitory computer-readable medium may also include one or more of the following features. For instance, the non-transitory computer-readable medium includes code for causing the first wireless communication device to receive, based on the monitoring, a second COT occupancy signal associated with a second COT of the plurality of COTs and code for causing the first wireless communication device to refrain, based on receiving the second COT occupancy signal, from transmitting during the second COT. The code for causing the first wireless communication device to receive the second COT occupancy signal includes code for causing the first wireless communication device to receive the second COT occupancy signal from a second wireless communication device that won the first reserved time interlace. The code for causing the first wireless communication device to receive the second COT occupancy signal includes code for causing the first wireless communication device to receive the second COT occupancy signal from a second wireless communication device, the second wireless communication device receiving one or more communications from a third wireless communication device that won the first reserved time interlace. The non-transitory computer-readable includes code for causing the first wireless communication device to contend for a second reserved time interlace, the second reserved time interlace being different than the first reserved time interlace. The code for causing the first wireless communication device to contend for the second reserved time interlace is configured to execute in response to losing the first reserved time interlace. The non-transitory computer-readable medium includes code for causing the first wireless communication device to receive a first reservation signal indicating a reservation of the first reserved time interlace by a second wireless communication device. The code for causing the first wireless communication device to receive the first reservation signal includes at least one of code for causing the first wireless communication device to receive a request-to-send (RTS) signal, code for causing the first wireless communication device to receive a clear-to-send (CTS) signal, or code for causing the first wireless communication device to receive a CTS-to-self signal. The code for causing the first wireless communication device to receive the first reservation signal includes code for causing the first wireless communication device to receive the first reservation signal from the second wireless communication device. The code for causing the first wireless communication device to receive the first reservation signal includes code for causing the first wireless communication device to receive the first reservation signal from a third wireless communication device in communication with the second wireless communication device. The first wireless communication device includes a base station. The first wireless communication device includes a user equipment (UE).

Further embodiments of the present disclosure include an apparatus. The apparatus includes means for contending for a first reserved time interlace, the first reserved time interlace including a plurality of channel occupancy times (COTs), means for transmitting, in response to winning the first reserved time interlace, a first communication signal in a first COT of the plurality of COTs, and means for transmitting, in response to winning the first reserved time interlace, a second communication signal in a second COT of the plurality of COTs, the second COT spaced in time from the first COT.

The apparatus may also include one or more of the following features. The apparatus includes means for contending for a second reserved time interlace, the second reserved time interlace being different than the first reserved time interlace. The apparatus includes means for refraining, in response to winning the first reserved time interlace, from contending for a second reserved time interlace, the second reserved time interlace being different than the first reserved time interlace. The means for contending for the first reserved time interlace includes means for contending for the first reserved time interlace using a first contention technique, wherein the first contention technique is associated with a first length of the first reserved time interlace and a second contention technique is associated with a second length of the first reserved time interlace, the second length being different than the first length. The means for contending for the first reserved time interlace using the first contention technique includes means for contending for the first reserved time interlace using at least one of a clear channel assessment (CCA), an extended clear channel assessment (ECCA), a contention window 1 (CW1), a contention window 2 (CW2), a category 2 listen-before-talk (LBT), a category 3 LBT, or a category 4 LBT. The first length includes a first number of COTs and the second length includes a second number of COTs, the second number of COTs being different than the first number of COTs. The first length includes a first length of time and the second length includes a second length of time, the second length of time being different than the first length of time. The apparatus includes means for transmitting a first COT occupancy signal associated with the first COT and means for transmitting a second COT occupancy signal associated with the second COT. The apparatus includes means for refraining from transmitting a third COT occupancy signal associated with a third COT of the plurality of COTs. The apparatus includes means for determining not to transmit data within the third COT, wherein the means for refraining from transmitting the third COT occupancy signal is in communication with the means for determining not to transmit data within the third COT. The apparatus includes means for transmitting, in response to winning the first reserved time interlace, a first reservation signal indicating a reservation of the first reserved time interlace. The means for transmitting the first reservation signal includes at least one of means for transmitting a request-to-send (RTS) signal, means for transmitting a clear-to-send (CTS) signal, or means for transmitting a CTS-to-self signal. The apparatus includes a base station. The apparatus includes a UE.

Further embodiments of the present disclosure include an apparatus. The apparatus includes means for contending for a first reserved time interlace, the first reserved time interlace including a plurality of COTs, means for monitoring, in response to losing the first reserved time interlace, for a COT occupancy signal associated with each of the plurality of COTs; and means for transmitting, based on the monitoring not detecting a first COT occupancy signal associated with a first COT of the plurality of COTs, a first communication signal in the first COT.

The apparatus may also include one or more of the following features. The apparatus includes means for receiving, based on the monitoring, a second COT occupancy signal associated with a second COT of the plurality of COTs, and means for refraining, based on the receiving the second COT occupancy signal, from transmitting during the second COT. The means for receiving the second COT occupancy signal includes means for receiving the second COT occupancy signal from a second wireless communication device that won the first reserved time interlace. The means for receiving the second COT occupancy signal includes means for receiving the second COT occupancy signal from a second wireless communication device, the second wireless communication device receiving one or more communications from a third wireless communication device that won the first reserved time interlace. The apparatus includes means for contending for a second reserved time interlace, the second reserved time interlace being different than the first reserved time interlace. The means for contending for the second reserved time interlace is configured to operate in response to losing the first reserved time interlace. The apparatus includes means for receiving a first reservation signal indicating a reservation of the first reserved time interlace by a second wireless communication device. The means for receiving the first reservation signal includes at least one of means for receiving a request-to-send (RTS) signal, means for receiving a clear-to-send (CTS) signal, or means for receiving a CTS-to-self signal. The means for receiving the first reservation signal includes means for receiving the first reservation signal from the second wireless communication device. The means for receiving the first reservation signal includes means for receiving the first reservation signal from a third wireless communication device in communication with the second wireless communication device. The apparatus includes a base station. The apparatus includes a UE.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
contending, by a first wireless communication device, for a first reserved time interlace, the first reserved time interlace including a plurality of channel occupancy times (COTs);
transmitting, by the first wireless communication device in response to winning the first reserved time interlace, a first communication signal in a first COT of the plurality of COTs;
transmitting, by the first wireless communication device in response to winning the first reserved time interlace, a second communication signal in a second COT of the plurality of COTs, the second COT spaced in time from the first COT; and
transmitting, by the first wireless communication device, at least one of:
a first COT occupancy signal associated with the first COT; or
a second COT occupancy signal associated with the second COT.

2. The method of claim 1, further comprising:
contending, by the first wireless communication device, for a second reserved time interlace, the second reserved time interlace being different than the first reserved time interlace.

3. The method of claim 1, further comprising:
refraining, by the first wireless communication device in response to winning the first reserved time interlace, from contending for a second reserved time interlace, the second reserved time interlace being different than the first reserved time interlace.

4. The method of claim 1, wherein the contending for the first reserved time interlace includes: contending, by the first wireless communication device, for the first reserved time interlace using a first contention technique out of the first contention technique and a second contention technique, wherein the first contention technique is associated with a first reserved-time-interlace length and a second contention technique is associated with a second reserved-time-interlace length, the second reserved-time-interlace length being different than the first reserved-time-interlace length.

5. The method of claim 4, wherein the first reserved-time-interlace length includes at least one of:
a first number of COTs, wherein the second reserved-time-interlace length includes a second number of COTs, the second number of COTs being different than the first number of COTs, or
a first length of time, wherein the second reserved-time-interlace length includes a second length of time, the second length of time being different than the first length of time.

6. The method of claim 1, further comprising:
transmitting, by the first wireless communication device, the first COT occupancy signal associated with the first COT; and
transmitting, by the first wireless communication device, the second COT occupancy signal associated with the second COT.

7. The method of claim 6, further comprising:
refraining, by the first wireless communication device, from transmitting a third COT occupancy signal associated with a third COT of the plurality of COTs.

8. The method of claim 7, further comprising:
determining, by the first wireless communication device, not to transmit data within the third COT, wherein the refraining from transmitting the third COT occupancy signal is based on the determining not to transmit data within the third COT.

9. The method of claim 1, further comprising:
transmitting, by the first wireless communication device in response to winning the first reserved time interlace, a first reservation signal indicating a reservation of the first reserved time interlace by the first wireless communication device.

10. A method of wireless communication, comprising:
contending, by a first wireless communication device, for a first reserved time interlace, the first reserved time interlace including a plurality of channel occupancy times (COTs);
monitoring, by the first wireless communication device in response to losing the first reserved time interlace, for a COT occupancy signal associated with each of the plurality of COTs;
transmitting, by the first wireless communication device based on the monitoring not detecting a first COT occupancy signal associated with a first COT of the plurality of COTs, a first communication signal in the first COT; and
receiving, by the first wireless communication device from a second wireless communication device, based on the monitoring, a second COT occupancy signal associated with a second COT of the plurality of COTs; and
refraining, by the first wireless communication device based on the receiving the second COT occupancy signal, from transmitting during the second COT.

11. The method of claim 10, wherein the second wireless communication device won the first reserved time interlace.

12. The method of claim 10, wherein the receiving the second COT occupancy signal includes: receiving, by the first wireless communication device, the second COT occupancy signal from a second wireless communication device, the second wireless communication device receiving one or more communications from a third wireless communication device that won the first reserved time interlace.

13. The method of claim 10, further comprising:
contending, by the first wireless communication device, for a second reserved time interlace, the second reserved time interlace being different than the first reserved time interlace.

14. The method of claim 13, wherein the contending, by the first wireless communication device, for the second reserved time interlace is in response to losing the first reserved time interlace.

15. The method of claim 10, further comprising:
receiving, by the first wireless communication device, a first reservation signal indicating a reservation of the first reserved time interlace by a second wireless communication device.

16. An apparatus, comprising:
a processor configured to:
contend for a first reserved time interlace, the first reserved time interlace including a plurality of channel occupancy times (COTs); and
a transceiver in communication with the processor, the transceiver configured to:
transmit, in response to winning the first reserved time interlace, a first communication signal in a first COT of the plurality of COTs;
transmit, in response to winning the first reserved time interlace, a second communication signal in a second COT of the plurality of COTs, the second COT spaced in time from the first COT; and
transmit at least one of:
a first COT occupancy signal associated with the first COT; or
a second COT occupancy signal associated with the second COT.

17. The apparatus of claim 16, wherein the processor is further configured to:
contend for a second reserved time interlace, the second reserved time interlace being different than the first reserved time interlace.

18. The apparatus of claim 16, wherein the processor is further configured to:
refrain, in response to winning the first reserved time interlace, from contending for a second reserved time interlace, the second reserved time interlace being different than the first reserved time interlace.

19. The apparatus of claim 16, wherein the processor is further configured to:
contend for the first reserved time interlace using a first contention technique out of the first contention technique and a second contention technique, wherein the first contention technique is associated with a first reserved-time-interlace length and a second contention technique is associated with a second reserved-time-interlace, the second reserved-time-interlace length being different than the first reserved-time-interlace length.

20. The apparatus of claim 19, wherein the first reserved-time-interlace length includes at least one of:
a first number of COTs, wherein the second reserved-time-interlace length includes a second number of COTs, the second number of COTs being different than the first number of COTs, or
a first length of time, wherein the second reserved-time-interlace length includes a second length of time, the second length of time being different than the first length of time.

21. The apparatus of claim 16, wherein the transceiver is further configured to: transmit the first COT occupancy signal associated with the first COT; and transmit the second COT occupancy signal associated with the second COT.

22. The apparatus of claim 21, wherein the transceiver is further configured to:
refrain from transmitting a third COT occupancy signal associated with a third COT of the plurality of COTs.

23. The apparatus of claim 22, wherein the processor is further configured to: determine not to transmit data within the third COT.

24. The apparatus of claim 16, wherein the transceiver is further configured to:
transmit, in response to winning the first reserved time interlace, a first reservation signal indicating a reservation of the first reserved time interlace.

25. An apparatus, comprising: a processor configured to:
contend for a first reserved time interlace, the first reserved time interlace including a plurality of channel occupancy times (COTs); and
a transceiver in communication with the processor, the transceiver configured to:
monitor, in response to losing the first reserved time interlace, for a COT occupancy signal associated with each of the plurality of COTs;
transmit, based on the monitoring not detecting a first COT occupancy signal associated with a first COT of the plurality of COTs, a first communication signal in the first COT; and
receive, from a second wireless communication device, based on the monitoring, a second COT occupancy signal associated with a second COT of the plurality of COTs; and
refrain, based on receiving the second COT occupancy signal, from transmitting during the second COT.

26. The apparatus of claim 25, wherein the second wireless communication device won the first reserved time interlace.

27. The apparatus of claim 25, wherein the transceiver is further configured to:
receive the second COT occupancy signal from a second wireless communication device, the second wireless communication device receiving one or more communications from a third wireless communication device that won the first reserved time interlace.

28. The apparatus of claim 25, wherein the processor is further configured to:
contend for a second reserved time interlace, the second reserved time interlace being different than the first reserved time interlace.

* * * * *